United States Patent [19]

Van Amstel

[11] Patent Number: 5,013,108
[45] Date of Patent: May 7, 1991

[54] OPTICAL SCANNING DEVICE AND MIRROR CORRECTION SYSTEM FOR USE IN SUCH A DEVICE

[75] Inventor: Willem D. Van Amstel, Eindhoven, Netherlands

[73] Assignee: U.S. Philips Corporation, New York, N.Y.

[21] Appl. No.: 379,514

[22] Filed: Jul. 13, 1989

[30] Foreign Application Priority Data

Jul. 15, 1988 [NL] Netherlands ................. 8801803

[51] Int. Cl.$^5$ ............................................. G02B 26/10
[52] U.S. Cl. ......................................... 350/6.1; 350/6.8; 358/208
[58] Field of Search ................. 350/6.1, 6.5, 6.6, 6.7, 350/6.8, 6.91, 3.71, 619, 620; 250/234, 235, 236, 237 G, 561; 358/208, 496, 206

[56] References Cited

U.S. PATENT DOCUMENTS

| | | | |
|---|---|---|---|
| 3,365,724 | 1/1968 | Brown et al. | 358/208 |
| 3,881,801 | 5/1975 | Bechtold | 350/6.91 |
| 4,234,240 | 11/1980 | Moore et al. | 350/6.1 |
| 4,629,283 | 12/1986 | Plast | 350/6.8 |
| 4,766,308 | 8/1988 | Karlsson | 350/6.8 |
| 4,836,666 | 6/1989 | Meinel et al. | 350/620 |

FOREIGN PATENT DOCUMENTS

3431540 3/1986 Fed. Rep. of Germany.

OTHER PUBLICATIONS

Applied Optics, vol. 17, No. 2, 15-1-78, pp. 203-210, by K. Klose.

Primary Examiner—Bruce Y. Arnold
Assistant Examiner—Loha Ben
Attorney, Agent, or Firm—Bernard Tiegerman

[57] ABSTRACT

An optical scanning device comprises a rotatable polygon mirror (40), or another deflection system, which is arranged between an objective system (30) and the surface (61) to be scanned. In order that the image point (21) moves along a straight line across the surface (61), a correction system is provided which comprises two unidirectionally curved mirrors (51 and 52), the first (51) of which has a hyperbola-cylindrical shape and the second (52) has a parabola-cylindrical shape.

4 Claims, 4 Drawing Sheets

OPTICAL SCANNING DEVICE AND MIRROR CORRECTION SYSTEM FOR USE IN SUCH A DEVICE

BACKGROUND OF THE INVENTION

1. Field of The Invention

The invention relates to a scanning device for optically scanning surface of an object along a line, which device comprises a radiation source unit for supplying a scanning beam, an optical system for forming a point of smallest constriction in the scanning beam and for forming a scanning spot on the surface by means of the scanning beam, and a deflection system for deflecting the scanning beam through a variable deflection angle to a position on the surface to be scanned, said optical system comprising a main imaging system which is arranged in the radiation path of the scanning beam between the radiation source unit and the deflection system and a correction system which is arranged in the radiation path of the scanning beam between the deflection system and the surface to be scanned.

2. Description of the Related Art

A scanning device of the type referred to above is described by K. Klose in the Article "Application of additional mirrors for rectilinear laser scanning of wide formats", published in "Applied Optics", Vol. 17, No. 2, pp. 203-210 (1978). As has been described in this article, the point of smallest constriction in the scanning beam follows a curved track in the absence of the correction system. The point of smallest constriction is hereinafter referred to as the image point. Therefore, a correction system for converting this curved track to the straight line on the surface is required for high-resolution scanning of a flat surface along a straight line. In the known device this is effected in that the scanning beam is reflected by means of the correction system towards the line to be scanned in such a way that the total optical path length traversed by the radiation beam from the objective system to the line to be scanned remains equal to the image length, i.e. the distance between the objective system and the image point.

In the known device the focusing action of the correction system used is ignored. This focusing action results in the focal length of the entire optical system being smaller than that of the objective system alone. Moreover, the optical power of the optical system varies when the different parts of the correction system are traversed, and thus varies as a function of the adjustment of the deflection system. Also the position occupied by the correction system in the scanning beam varies. This means that the image point, the narrowest point in the scanning beam, is present at some distance from the line to be scanned, which distance also varies as a function of the magnitude of the deflection angle.

The known correction mirror is curved in one direction only so that the extra focusing effect also occurs in one direction only. A consequence of the resulting astigmatism is that the focusing effect cannot be compensated for by a displacement towards the correction system of the surface to be scanned. Due to the above-mentioned variation in the optical power of the optical system, this astigmatism cannot be simply corrected, for example by means of a cylindrical lens.

Due to the reversibility of the radiation path an optical system in a device as described in the opening paragraph may alternatively be used for scanning a surface from which radiation originates. The radiation from an area on the surface is then concentrated on a radiation-sensitive detection system by means of the optical system. The invention thus also relates to a scanning device for optically scanning the surface of an object along a line, which device comprises a radiation-sensitive detection system for detecting radiation from the surface, an optical system for imaging an area of the surface on the radiation-sensitive detection system and a deflection system for selecting said area of the surface, said optical system comprising a main imaging system which is arranged in the radiation path between the deflection system and the radiation-sensitive detection system and a correction system which is arranged between the surface to be scanned and the deflection system. Also if the scanning device comprises a radiation-sensitive detection system, the area to be scanned by a scanning device which is provided with the known optical system is imaged with a varying extent of defocus on the radiation-sensitive detection system. The invention also relates to a correction system which is suitable for use in such scanning devices.

SUMMARY OF THE INVENTION

It is an object of the invention to provide a correction system with which the image point describes a substantially straight line throughout the width of the surface to be scanned and in which astigmatism in the scanning beam substantially does not occur.

To this end the scanning device comprising a radiation source unit according to the invention is characterized in that the correction system is composed of at least two curved mirrors arranged one after the other in the radiation path of the scanning beam and in that the optical distance between the main imaging system and the point of smallest constriction is substantially independent of the deflection angle.

In a scanning device according to the invention for scanning a surface from which radiation originates, the correction system is composed of at least two curved mirrors arranged one after the other in the radiation path and the optical distance between the area of the surface selected by a setting of the deflection element and the main imaging system is independent of the setting of the deflection system, It has been found that the incorporation of a plurality of mirrors in the correction system can compensate for the local focusing or defocusing effect of a mirror by the likewise locally defocusing or focusing effect of another mirror arranged in the radiation path of the scanning beam. This has made it possible to obtain an equal optical distance between the main imaging system and the image point, which image point is always located to a sufficient extent in the surface to be scanned and the scanning spot thus has minimum dimensions.

The scanning device according to the invention is further characterized in that the correction system comprises a first and a second curved mirror, the first mirror having a convex reflecting surface and the second mirror is arranged in the radiation path between the first mirror and the surface to be scanned. The number of mirror surfaces of the correction system in this embodiment is not more than two. It has been found that a good correction can be obtained with two mirrors only.

A preferred embodiment of the scanning device according to the invention is characterized in that the first mirror has a hyperbola-cylindrical reflecting and the second mirror has a parabola-cylindrical reflecting surface. It has been found that not only a flat and corrected image field can be obtained with this mirror shape, but that also the major axis of the scanning beam is incident on the surface at substantially the same angle throughout the width of the surface to be scanned. This angle is a right angle realtive to the line to be scanned. By using the correction system according to the invention a so-called telecentric scanning method or a telecentric scanning system is obtained. In the plane perpendicular to the line to be scanned the angle of incidence can be freely chosen. A further important advantage of this embodiment is the very good f-$\theta$ correction which is obtained with it, i.e. the displacement of the scanning spot along the line to be scanned as a function of the deflection angle of the deflection system is linear to a great extent.

The invention also relates to a mirror correction system suitable for use in one of the scanning devices described. Such a correction system may not only be used in a scanning system for inspecting or reading a surface but, for example also in a device in which information is written in a surface by means of radiation, for example a laser printer.

BRIEF DESCRIPTION OF THE DRAWINGS

Embodiments of the invention will now be described in greater detail with reference to the accompanying drawings in which.

DETAILED DESCRIPTION OF THE PREFERRED EMBODIMENTS

Figure 1:
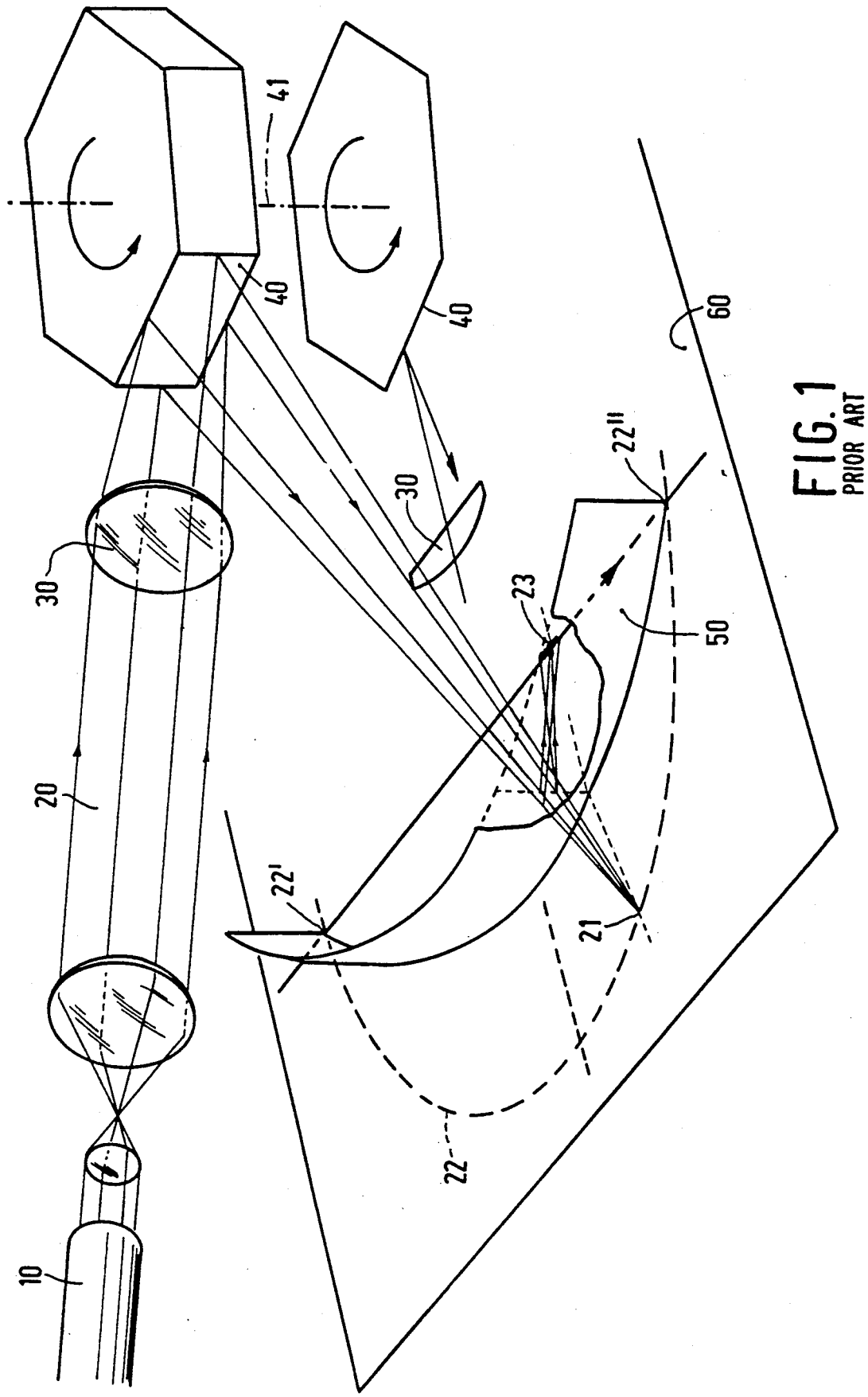
FIG. 1 shows a known scanning device with a correction system comprising only one mirror.

FIG. 1 shows diagrammatically a known scanning system in which a scanning spot is moved by means of a deflection element on a surface along a line to be scanned. A scanning beam 20 is generated by a light source 10, for example a HeNe laser or a diode laser. The beam is deflected towards the surface 60 to be scanned by means of a rotatable mirror 40, for example a reflecting side face of a rotatable polygon. The axis of rotation of the rotatable mirror is perpendicular to the surface 60. A main imaging system or objective system 30 focusing the scanning beam in an image point 21 is arranged between the Figure by means of a single lens. The distance between the objective system 30 and the image point 21 is referred to as the image length. By rotating the deflection mirror 40 around an axis 41, the image length. By rotating the deflection mirror 40 around an axis 41, the image point 21 describes a curved track 22 between the two extreme points 22' and 22" shown. This means that the scanning spot which is formed by the beam 20 on the surface 60 to be scanned describes a curved trajectory. This is undersirable from a point of view of reconstruction of the surface structure. A rotation of the surface around the line through the points 22' and 22" means that the scanning spot is out of focus over a large part of the trajectory, which is also undersirable.

A curved mirror 50 is arranged in the radiation path the scanning beam so as to cause the image point to describe a straight line across the surface 60. This mirror has such a shape tha the optical path length between the objective system 30 and the surface 60, via the deflection mirror 40 and the correction mirror 50, is independent of the position of the deflection mirror 40 and is equal to the image length.

In this case it is, however, ignored that the mirror 50 has a curvature in one direction so that the converging beam will exhibit astigmatism and the scanning spot 23 on the surface 60 thus becomes line-shaped, the line formed extending in the direction of movement of the spot.

It is to be noted that the deflection system need not necessarily be a rotatable mirror such as a reflecting side face of a polygon or a galvanometer mirror, but also other deflection systems, for example an acousto-optical element or a rotatable hologram can be used.

Figures 2A, 2B:
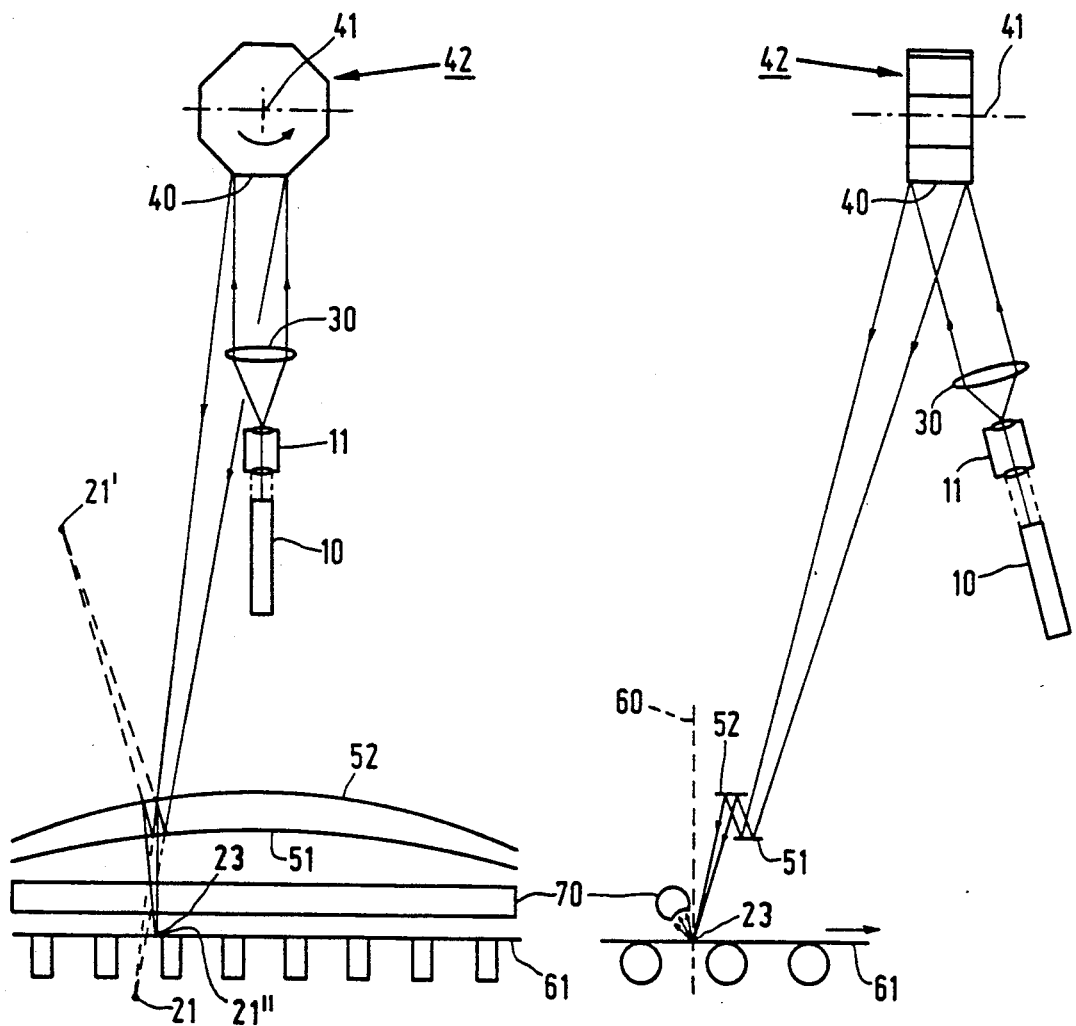
FIG. 2a and 2b show an embodiment of the scanning device accoridng to the invention with a correction system comprising two mirrors.

FIGS. 2a and 2b show an embodiment of the scanning system according to the invention in front and side elevations. The correction sy:tem comprises two curved mirrors 51 and 52. The mirror 51 is convex and has a hyperbola-cylindrical shape, with the generatrix being parallel to the axis of rotation of the rotatable mirror 40. The mirror 52 is concave and has a parabol-cylindrical shape.

The optical distance covered by the beam between the radiation source 10 and the surface 61 to be scanned is equal for any adjustment of the deflection system 42, likewise as the position of the objective system 30 therein. However, if the adjustment of the deflection system 42 varies, the positions of the elements of the correction system 51 and 52 vary in the radiation path of the beam while also the power of the elements varies. The net result is that the light source 10 is imaged at the same distance.

As compared with FIG. 1, the surface to be scanned is rotated through approximately 90° about the line to be scanned. The surface to be scanned is denoted by the reference numeral 61. For the purpose of illustration, the surface 60, whose orientation corresponds to the surface 60 of FIG. 1, is shown in a broken line.

It has been found that the requirements for a correction system can be satisfied by a combination of the hyperbolic and parabolic mirror. The total image length of the scanning beam in the plane in which the mirrors have a power is equal to that in the plane perpendicular thereto so that no astigmatism occurs. Moreover, the track described by the image point formed in this way very accurately a straight line in the surface 60.

The mirror 51 reduces the convergence of the scanning beam so that an image point 21' is obtained at a larger distance from the mirror 51 than the original image point 21. The second parabolically curved mirror 52 subsequently focuses the scanning beam to the image point 21" on the surface 60 to be scanned so that the scanning spot 23 coincides therewith and has minimum dimensions.

The radiation from the radiation spot reflected by the surface is received in a detection system 70 where the intensity modulation, caused by the surface structure, in the radiation reflected by the surface is converted to the modulation of an electric signal which is suitable for further processing.

FIGS. 2a and 2b show a polygon 42 with reflecting side faces 40 as a beam-deflecting system. The polygon 42 is rotatable about an axis 41 so that the scanning beam can be deflected towards different positions on the surface 60.

Since the axis 41 about which the reflecting face 40 rotates is not located in the face 40, the parameters of the correction mirrors 51 and 52 are to be adapted to this situation. The shape and positions of the mirrors 51 and 52 are therefore slightly different from the shape and positions which the mirrors of the correction system would have if a galvenometer mirror, whose axis of rotation is located in the reflecting plane, had been used as a beam-deflecting element. It has been found that a hyperbolic and parabolic shape of the mirrors are satisfactory within the tolerances imposed on such a system.

Figure 3A:
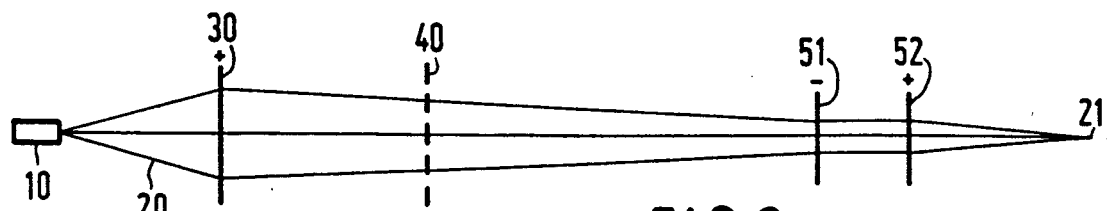
FIGS. 3a, 3b and 3c show diagrammatically the radiation path through the scanning device at different adjustments of the deflection system and in the plane in which the correction system has no optical power.
Figure 3B:
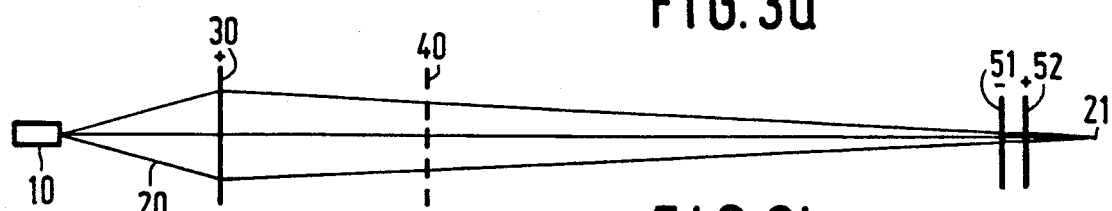
Figure 3C:
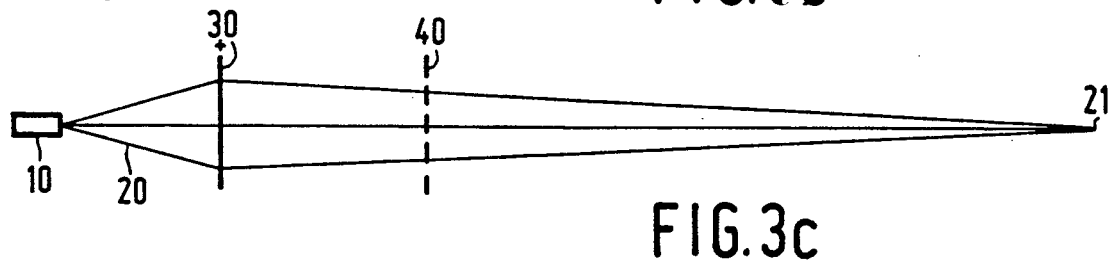

In FIGS. 3a and 3b the radiation path for this system is shown diagrammatically in the situation in which the scanning beam is in the central position and in an extreme position. For the purpose of comparison, FIG. 3c shows the radiation path also diagrammatically in the plane in which the element do not have any power. The image length between the main imaging system 30 and the image point 21 is equal in all three Figures. The position of the deflection system 40 is indicated by means of a broken line. When the scanning beam occupies the central position, the distance between the two mirrors 51 and 52 is relatively large and the distance between the mirrors and the image point is also relatively large. In an extremem position, as shown in FIG. 3b, these distances are relatively small. It is to be noted that the scanning beam between the mirrors 51 and 52 is shown as a parallel beam so as to clarify the Figure. In a real embodiment, this part of the scanning beam will generally not be parallel.

Figure 4:
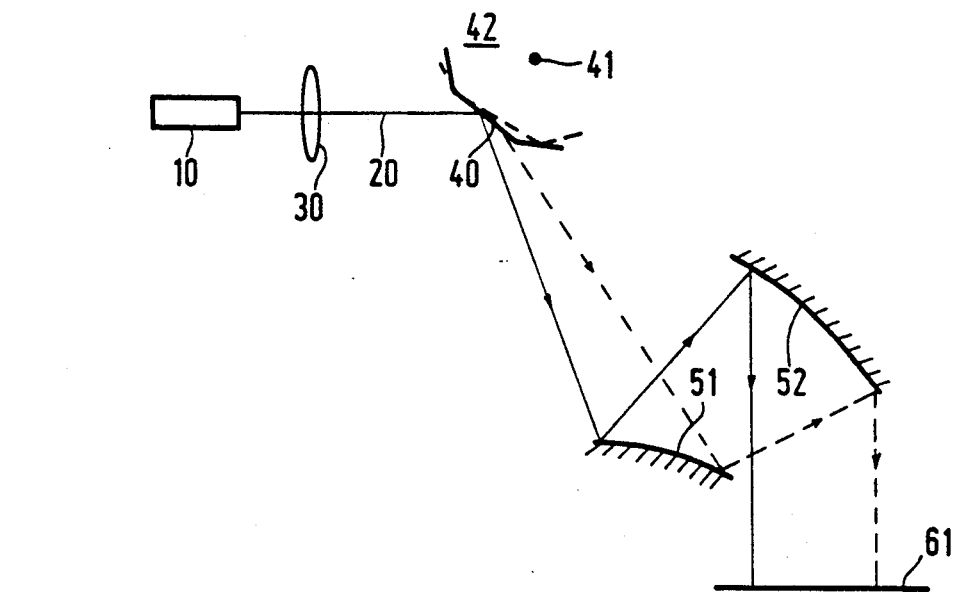
FIG. 4 shows a second embodiment of a scanning device according to the invention.

In the embodiment described hereinbefore the chief ray of the beam incident on the polygon is directed to the axis rotation of the polygon. FIG. 4 shows an embodiment in which the major axis of the incident beam is directed besides the axis of rotation of the polygon. In such an arrangement the apparent point of rotation of the scanning beam is in a different position so that the exact parameters of the correction mirrors should be adapted thereto.

The embodiment shown in FIG. 2 is realized for scanning a Printed Circuit Board (PCB). The scanning width is 439.5 mm, the objective system comprises a system of lenses with a focal length of 800 mm. The deflection system comprises an "overexposed" prismatic polygon having sixteen facets each at a distance to the axis of rotation of 30.01 mm. "Overexposed" means that the diameter of the scanning beam at the area of the polygon is larger than the length of the facets. The first correction mirror is a cylindrical hyperbola whose hyperbolic shape is described by equation $(X/a)^2 - (Y/b)^2 = 1$, with $a = 69.259$ mm and $b = 363.46$ mm. The second correction mirror is a cylindrical parabola whose parabolic shape is characterized by a focal length of 387,5865 mm. Projected in a plane perpendicular to the axis rotation of the mirror, the distance between the axis of rotation and the centre of the first mirror is approximately 454 mm and the distance between the projected centres of the two mirrors is approximately 87 mm. The scanning beam is incident on the reflecting side faces of the polygon at an angle of 75° to the axis of rotation. In this embodiment the image point is formed at approximately 40 mm behind the first correction mirror. In this embodiment the image point describes a path across the surface of the PCB which does not deviate by more than 5 μm from a straight line in the plane and which does not deviate by more than 10 μfrom the theoretical flat plane in the vertical direction. Scanning is telecentric with a deviation which is not more than 0.05 mrad and the position of the scanning spot is linear with the deflection angle with a deviation of no more than 0.5% of the scanning width.

Figure 5A:
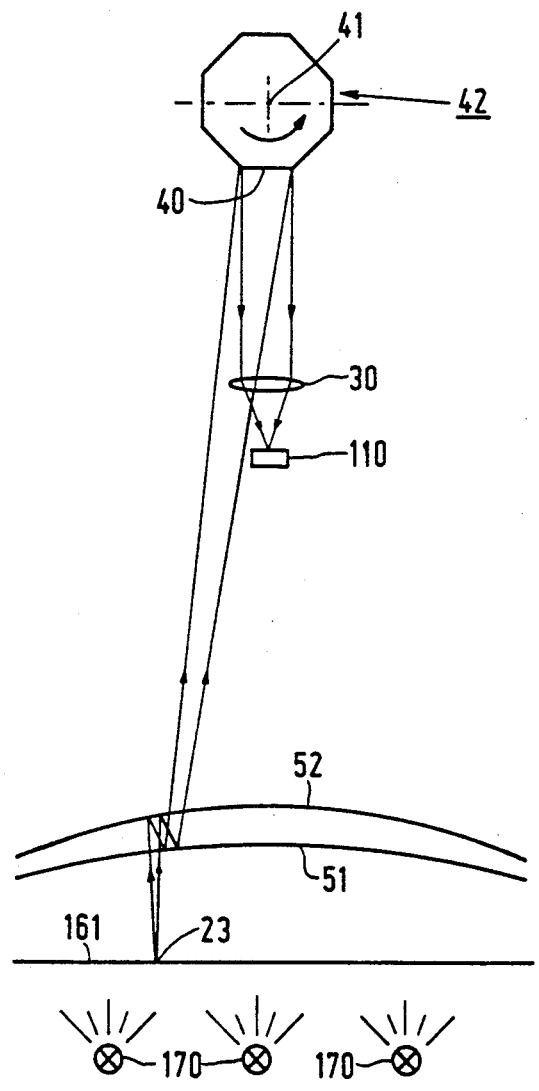
FIGS. 5a and 5b show a scanning device in which radiation originating from the surface to be scanned is concentrated on a radiation-sensitive detection system.
Figure 5B:
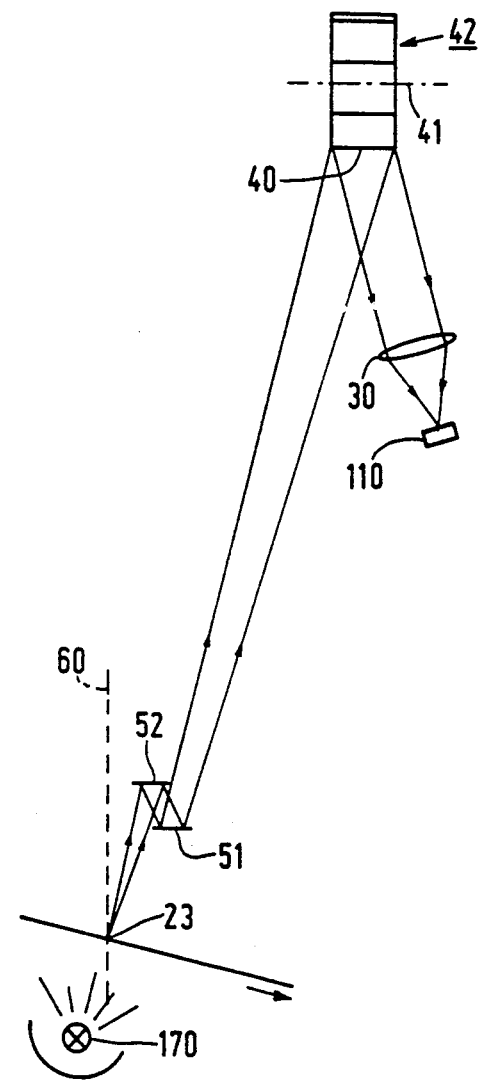

FIG. 5 shows an embodiment in which a surface is scanned by means of a radiation-sensitive detection system. The surface 161, for example a photographic negative, is illuminated from the below by means of a light source 170. The light is scattered, partly absorbed and partly reflected by the structure to be scanned in the surface 161, so that the light passing through the surface 161 is modulated in conformity with a pattern present in this surface. A part of the light incident through the surface is received by the main imaging system 30 via the correction mirrors 52 and 51 and the rotating polygon 42. An area of the surface is imaged via this system on the radiation-sensitive detection system 110. In such a scanning device the correction system ensures that the selected area from which light is incident on the detection system is imaged on the detection system with imaging errors which can be ignored, and thus the resolution of the scanning device is maximal.

The radiation-sensitive detection system 110 may comprise a single detection element for detecting the radiation from a single point in the surface, but also a multiple detection system such as a diode or a CCD element for simultaneously detecting radiation from a part of the surface.

The surface 161 may of course also be illuminated from above. In particular the exposure may be effected by means of a scanning beam which is guided to the surface to be scanned via the objective system 30, the deflection system 42 and the correction system 51 and 52. In such an exposure method the projected scanning beam should be separated in known manner, for example by means of a semi-transparent mirror, from the relected radiation beam from the surface, which beam is guided towards the detection system.

A scanning device according to the invention may be used in numerous scanning apparatuses, not only for automated inspection of printed circuit boards but also, for example when digitizing photographs or drawings, for example X-ray photographs or aerial or satellite pictures. A scanning device may also be used in a laser printer or in an apparatus for contactless measurement of the relief a profiled surface. Particularly the last-mentioned field of application has the advantage that the mirror system can be constructed in such a way that the surface is scanned telecentrically, i.e. the angle of incidence of the radiation beam is independent of the orientation of the deflection element.

What is claimed is:

1. A scanning device for optically scanning a surface of an object along a line, which device comprises a radiation source unit for supplying a scanning beam, an optical system for forming a point of smallest constriction in the scanning beam and for forming a scanning spot on the surface by means of the scanning beam, and deflection means for deflecting the scanning beam through a variable deflection angle to a position on the surface to be scanned, said optical system comprising a main imaging system which is arranged in the radiation path of the scanning beam between the radiation source unit and said deflection means and a correction system which is arranged in the radiation path of the scanning beam between said deflection means and the surface to be scanned, wherein the correction system is composed of at least two curved mirrors arranged one after the other in the radiation path of the scanning beam and the optical distance between the main imaging system and the point of smallest constriction is substantially independent of the deflection angle.

2. A scanning device for optically a scanning surface of an object along a line, which device comprises a radiation-sensitive detection system for detecting radiation from the surface, an optical system for imaging an area of the surface on the radiation-sensitive detection system and a deflection system for selecting said area of the surface to be scanned, said optical system comprising a main imaging system which is arranged in the radiation path between the deflection system and the radiation-sensitive detection system and a correction system which is arranged between the surface to be scanned and the deflection system, wherein the correction system is composed of at least two curved mirrors arranged one after the other in the radiation path and the optical distance between the area of the surface selected by a setting of the deflection system and the main imaging system is independent of the setting of the deflection system.

3. A scanning device as claimed 1 or 2, wherein the correction system comprises a first and a second curved mirror, the first mirror having a convex reflecting surface and the second mirror having a concave reflecting surface and the second mirror is arranged in the radiation path between the first mirror and the surface to be scanned.

4. A scanning device as claimed in claim 3, wherein the first mirror has a hyperbola-cylindrical reflecting surface and the second mirror has a parbola-cylindrical reflecting surface.

* * * * *